(12) United States Patent
Zou et al.

(10) Patent No.: US 10,192,053 B2
(45) Date of Patent: Jan. 29, 2019

(54) METHOD, APPARATUS, SYSTEM, DEVICE AND COMPUTER STORAGE MEDIUM FOR TREATING VIRUS

(71) Applicant: Baidu Online Network Technology (Beijing) Co., Ltd., Beijing (CN)

(72) Inventors: Rongxin Zou, Beijing (CN); Yinming Mei, Beijing (CN); Zhu Xiang, Beijing (CN); Hanzhong Hu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 31 days.

(21) Appl. No.: 15/119,692

(22) PCT Filed: Jun. 29, 2015

(86) PCT No.: PCT/CN2015/082604
§ 371 (c)(1),
(2) Date: Aug. 17, 2016

(87) PCT Pub. No.: WO2016/095479
PCT Pub. Date: Jun. 23, 2016

(65) Prior Publication Data
US 2017/0316206 A1    Nov. 2, 2017

(30) Foreign Application Priority Data
Dec. 19, 2014    (CN) .......................... 2014 1 0802502

(51) Int. Cl.
*G06F 21/00*    (2013.01)
*H04L 29/06*    (2006.01)
(Continued)

(52) U.S. Cl.
CPC ............ *G06F 21/564* (2013.01); *G06F 11/34* (2013.01); *G06F 21/56* (2013.01); *G06F 21/568* (2013.01); *H04L 67/10* (2013.01); *G06F 21/561* (2013.01)

(58) Field of Classification Search
CPC ...... G06F 21/564; G06F 21/568; G06F 11/34; G06F 21/56; G06F 21/561; H04L 67/10
See application file for complete search history.

(56) References Cited

U.S. PATENT DOCUMENTS 6,802,028 B1 * 10/2004 Ruff ...................... G06F 21/567
714/25
7,210,041 B1   4/2007 Gryaznov et al.
(Continued)

FOREIGN PATENT DOCUMENTS

| CN | 102281540 A | 12/2011 |
| CN | 104077525 A | 10/2014 |

(Continued)

OTHER PUBLICATIONS

International Search Report for Application No. PCT/CN2015/092462 dated Oct. 21, 2016, in 4 pages.

*Primary Examiner* — Lisa C Lewis
(74) *Attorney, Agent, or Firm* — Knobbe, Martens, Olson & Bear, LLP

(57) ABSTRACT

The present invention provides a method, apparatus, system, device and a computer storage medium for treating virus. A client reports a scan log to a cloud service platform, and/or reports virus family information to the cloud service platform after the virus family information is identified based on the scan log. The cloud service platform identifies the scan log to obtain virus family information, and/or issues the virus removal instruction corresponding to the virus family information to the client after receiving the virus family information from the client, for the client to execute the (Continued)

virus removal instruction. Compared with the method of simply performing the behavior analysis and deleting files by the client, it is more advantageous that the method of the present invention issues virus removal instructions regarding the virus family information from the cloud, the virus treating is more personalized and precise, and the security of the machine system is improved.

7 Claims, 5 Drawing Sheets

(51) Int. Cl.
*G06F 21/56* (2013.01)
*G06F 11/34* (2006.01)
*H04L 29/08* (2006.01)

(56) References Cited

U.S. PATENT DOCUMENTS

| | | |
|---|---|---|
| 2005/0188272 A1 | 8/2005 | Bodorin et al. |
| 2007/0180525 A1* | 8/2007 | Bagnall ................ G06Q 10/10 726/23 |
| 2008/0127336 A1 | 5/2008 | Sun et al. |
| 2008/0289042 A1 | 11/2008 | Bai et al. |
| 2010/0031093 A1* | 2/2010 | Sun ..................... G06F 21/552 714/45 |
| 2011/0271341 A1 | 11/2011 | Satish et al. |
| 2013/0061325 A1 | 3/2013 | Singh et al. |
| 2013/0247187 A1 | 9/2013 | Hsiao et al. |
| 2013/0254884 A1* | 9/2013 | Dalcher .............. G06F 11/3466 726/22 |
| 2016/0173515 A1 | 6/2016 | Boutnaru et al. |
| 2016/0232351 A1* | 8/2016 | Guo ..................... G06F 21/564 |

FOREIGN PATENT DOCUMENTS

| | | |
|---|---|---|
| CN | 104298920 A | 1/2015 |
| CN | 104573515 A | 4/2015 |
| WO | WO 2013/036664 | 3/2013 |
| WO | WO 2013/142228 | 9/2013 |
| WO | WO 2014/122662 | 8/2014 |

* cited by examiner

METHOD, APPARATUS, SYSTEM, DEVICE AND COMPUTER STORAGE MEDIUM FOR TREATING VIRUS

CROSS REFERENCE TO RELATED APPLICATIONS

The present application claims the priority of Chinese patent application 201410802502.6, filed on Dec. 19, 2014 and entitled "METHOD, APPARATUS AND SYSTEM FOR TREATING VIRUS."

TECHNICAL FIELD

The present invention relates to the field of computer application technology, and in particular, to a method, apparatus, system, device and computer storage medium for treating virus.

BACKGROUND ART

With the rapid development of the Internet, a profit linker for a grey industry that aggregates website traffic based on viral modes and monetize the advertisement traffic has been formed. Every day, hundreds of malwares come out, using offensive technologies to bundle or guard mutually by means of processes, registers and files to constantly update the virus file's behavior characteristics so as to prevent an antivirus software from detecting and destructing them.

Internet virus files may currently spread through the following fashion: it uses a cloud control instruction to modify the default browser home page and search engine of a user in a machine system, modify keyword search rankings, intercept browser pop-up ads, maliciously tamper the desktop shortcut associations, install malicious plug-in software that is not needed by the user, and steal the user's private contents. A traditional antivirus software mainly searches and destroys malicious behaviors of files, and deletes the corresponding files when malicious behaviors are found. When it comes to an Internet virus file, the virus file usually cannot be completely deleted by simply performing a behavior analysis and file deletion at the client of the machine system, resulting in an inferior security of the machine systems.

SUMMARY

In view of the above, the present invention provides a virus treating method, apparatus, system, and device and a computer storage medium, in order to improve the security of a machine system.

A particular technical solution is as follows.

The present invention provides a virus treating method, the method including:

determining virus family information corresponding to a virus file behavior scanned by a client; and issuing a virus removal instruction corresponding to the determined virus family information to the client based on a correlation between the virus family information and the virus removal instruction, for the client to execute the virus removal instruction to remove a virus file.

According to one preferred embodiment of the present invention, the determining virus family information corresponding to a virus file behavior scanned by a client includes:

receiving a scan log reported by the client, the scan log containing virus file behavior information scanned by the client; and matching the virus file behavior information with a cloud behavior linker script library, to determine virus family information corresponding to malicious virus file behavior, wherein the behavior linker script library contains malicious virus file behavior information of a virus family.

According to one preferred embodiment of the present invention, the determining virus family information corresponding to a virus file behavior scanned by a client includes:

receiving an identification result reported by the client; and acquiring the virus family information from the identification result, the virus family information being determined by the client after matching the scanned virus behavior information with a local behavior linker script library of the client, wherein the behavior linker script library contains malicious virus file behavior information of the virus family.

According to one preferred embodiment of the present invention, the method further includes:

analyzing the scan log reported by the client to obtain updated virus file behavior information; and updating the behavior linker script library of the cloud by using the updated virus file behavior information.

According to one preferred embodiment of the present invention, if the virus family information determined by matching the virus file behavior information contained in the scan log with the behavior linker script library of the cloud is inconsistent with the virus family information acquired from the identification result, the issued virus removal instruction is determined by using the virus family information determined by matching the virus file behavior information contained in the scan log with the behavior linker script library of the cloud, or the issued virus removal instruction is determined by using manually identified virus family information.

According to one preferred embodiment of the present invention, the virus file behavior information is the behavior information obtained by scanning at least one of the following content:

processes, loading modules, drivers, services, Rootkit, start-up items, IE-related items, boot virus, system directories, desktop directories, start menus, common software, scripts, system components, login sections, system start-up items, and so on.

According to one preferred embodiment of the present invention, the virus removal instruction includes following instructions:

locking a default home page, modifying a default browser search page, downloading specified tool software, or removing associated content of the malicious file virus behavior.

The present invention further provides a virus treating method, the method including:

scanning a virus file behavior;

reporting a scan log to a cloud service platform; and/or identifying the virus file behavior by using a local behavior linker script library, and reporting virus family information corresponding to the malicious virus file behavior to the cloud service platform if a malicious virus file behavior is identified, wherein the behavior linker script library contains malicious virus file behavior information of a virus family; and receiving and executing a virus removal instruction issued by the cloud service platform.

According to one preferred embodiment of the present invention, the method further includes: removing associated content of the malicious virus file behavior, if the malicious virus behavior is identified.

According to one preferred embodiment of the present invention, the method further includes:

loading the behavior linker script library of a cloud, and updating the local behavior linker script library with the cloud behavior linker script library.

According to one preferred embodiment of the present invention, the virus removal instruction includes following instructions:

locking a default home page, modifying a default browser search page, downloading specified tool software, or removing the associated content of the malicious virus behavior.

The present invention further provides a virus treating apparatus, the apparatus including:

a virus determining unit, configured to determine virus family information corresponding to a virus file behavior scanned by a client; and an instruction issuing unit, configured to issue a virus removal instruction corresponding to the virus family information determined by the virus determining unit to the client based on a correlation between the virus family information and the virus removal instruction, for the client to execute the virus removal instruction to remove virus.

According to one preferred embodiment of the present invention, the virus determining unit includes:

a first receiving sub-unit, configured to receive a scan log reported by the client, the scan log containing virus file behavior information scanned by the client; and a matching sub-unit, configured to match the virus file behavior information with a cloud behavior linker script library, to determine virus family information corresponding to a malicious virus file behavior, wherein the behavior linker script library contains malicious virus file behavior information of a virus family.

According to one preferred embodiment of the present invention, the virus determining unit includes:

a second receiving sub-unit, configured to receive an identification result reported by the client;

an acquiring sub-unit, configured to acquire virus family information from the identification result, the virus family information being determined by the client after matching the scanned virus file behavior information with a local behavior linker script library of the client, wherein the behavior linker script library contains malicious virus file behavior information of the virus family.

According to one preferred embodiment of the present invention, the apparatus further includes:

a generic analysis unit, configured to analyze the scan log reported by the client to obtain updated virus file behavior information; and a library updating unit, configured to update the behavior linker script library of the cloud by using the updated virus file behavior information.

According to one preferred embodiment of the present invention, if the virus family information determined by the matching sub-unit is inconsistent with the virus family information acquired by the acquiring sub-unit, the instruction issuing unit determines the issued virus removal instruction by using the virus family information determined by the matching sub-unit, or determines the issued virus removal instruction by using manually identified virus family information.

According to one preferred embodiment of the present invention, the virus file behavior information is behavior information obtained by scanning at least one of the following content:

processes, loading modules, drivers, services, Rootkit, start-up items, IE-related items, boot viruses, system directories, desktop directories, start menus, common software, scripts, system components, login sections, system start-up items, and so on.

According to one preferred embodiment of the present invention, the virus removal instruction includes following instructions:

locking a default home page, modifying a default browser search page, downloading specified tool software, or removing associated content of a malicious virus file behavior.

The present invention further provides a virus treating apparatus, the apparatus including: at least one of a log reporting unit and a virus identifying unit, a behavior scanning unit, and an instruction processing unit;

the behavior scanning unit, being configured to scan a virus file behavior;

the log reporting unit, being configured to report a scan log to a cloud service platform;

the virus identifying unit, being configured to identify the virus file behavior by using a local behavior linker script library, and report virus family information corresponding to the malicious virus file behavior to the cloud service platform if a malicious virus file behavior is identified, wherein the behavior linker script library contains malicious virus file behavior information of a virus family; and the instruction processing unit, being configured to receive and execute a virus removal instruction issued by the cloud service platform.

According to one preferred embodiment of the present invention, the apparatus further includes:

a virus removal unit, configured to remove associated content of the malicious virus file behavior if the virus identifying unit identifies the malicious virus file behavior.

According to one preferred embodiment of the present invention, the apparatus further includes:

a library updating unit, configured to load the behavior linker script library of a cloud, and update the local behavior linker script library by using the cloud behavior linker script library.

According to one preferred embodiment of the present invention, the virus removal instruction includes following instructions:

locking a default home page, modifying a default browser search page, downloading specified tool software, or removing the associated content of the malicious virus behavior.

The present invention further provides a virus treating system, the system including: a client and a cloud processing platform;

the cloud processing platform including the above first apparatus; and the client including the above second apparatus.

As can be observed from the above technical solutions, in the present invention, the client uploads the scan log to a cloud service platform, and/or reports virus family information to the cloud service platform after the information of the virus family is identified according to the scan log. The cloud service platform identifies the scan log to obtain virus family information, and/or issues the virus removal instruction corresponding to the virus family information to the client after receiving the virus family information from the client, for the client to execute the virus removal instruction. Compared with an approach of simply performing the behavior analysis and file deletion by the client, the approach of issuing the virus removal instruction from the cloud in view of the virus family information in the present invention is advantageous in that the virus treating becomes more personalized and precise, and the security of the machine system is improved.

DETAILED DESCRIPTION OF PREFERRED EMBODIMENTS

In order to increase the clarity of the objectives, technical solutions, and advantages of the present application, the present application will be described in detail with reference to accompanying drawings and specific embodiments.

Figure 1:
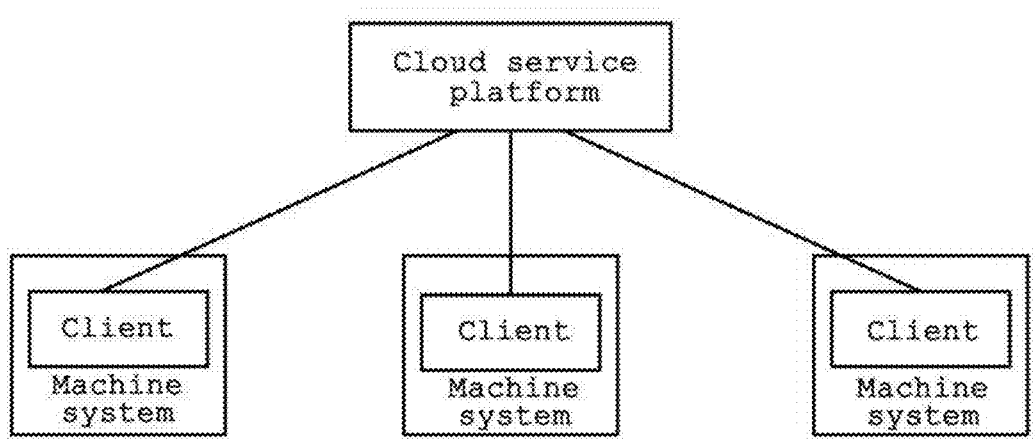
FIG. 1 is a structural view of a system provided by an embodiment of the present invention.

The embodiments of the present invention are primarily based on the system shown in FIG. 1. The system includes a client and a cloud service platform, wherein the client can be provided in a machine system such as a PC, a mobile phone or a tablet, and responsible for the security of the respective machine system.

In the embodiments of the present invention, the client has the following functions.

1) Scanning the behavior of a virus file, which is the most fundamental function of the client. Herein, several concepts used in the embodiments of the present invention are interpreted. A "virus file" refers to an original virus entity, namely one or more initial files that spread virus. After being executed, the original virus entity will generate a variety of offspring files and related behaviors thereof, not all files of the original virus entity are necessarily malicious. A "malicious virus file" refers to a malicious original virus entity, which is capable of releasing malicious offspring files or performing malicious network acts. "Virus file behavior" includes all possible behavior of an original virus entity. For example, the virus file behavior may be any behavior information obtained after the following items is scanned: processes, loading modules, drivers, services, Rootkit (Rootkit refers to software whose main function is to hide the processes of other programs, and may be one or more software combination), start-up items, IE-related items, boot virus, system directories, desktop directories, start menus, common software, scripts, system components, login sections, system start-up items, and so on. The "malicious virus file behavior" is the behavior of a malicious original virus entity.

2) Uploading a scan log to a cloud service platform. The scan log contains virus file behavior information scanned by the client, and uploaded to the cloud service platform for analysis.

3) Identify the virus file behavior with a local behavior linker script library. The behavior linker script library contains malicious virus file behavior information of a virus family. The virus file behavior information scanned by the client is compared to the information in the behavior linker script library, to determine whether the scanned virus file behavior is malicious virus behavior, and to further determine information on the virus family. The "virus family" is a generic name referring to a group of malicious virus files having similar behaviors, and the malicious virus belonging to the same virus family usually belongs to the same producer or comes from the same virus source file (for example, it is obtained by modifying the same virus source file). For example, in the behavior linker script library, the malicious virus file behavior information belonging to the same virus family is integrated, such that the corresponding virus family information thereof may be determined through the malicious virus file behavior.

In addition, the local behavior linker script library at the client can be obtained by loading the behavior linker script library of the cloud service platform and storing the same locally. For example, the client may periodically load the behavior linker script library from the cloud service platform and update the local behavior linker script library, as described below in function 6).

4) Reporting the virus family information corresponding to the malicious virus file behavior to the cloud service platform if malicious virus file behavior is identified. The virus family information herein may be the information such as a virus family ID (identity). In other words, if the client has been identified locally at the client to obtain the virus family ID, the virus family ID will be directly reported to the cloud service platform.

5) Removing the content associated with the malicious virus file behavior in the machine system where the client is located if the malicious virus file behavior is identified. In addition to reporting the virus family information, a virus removal mechanism may be installed locally at the client, for removing the associated content of the malicious virus file behavior in the machine system where the client is located, such as stopping services of the malicious virus file, deleting files of the malicious virus file, deleting registries or related activity items of the malicious virus file, and fixing the default browser home page. After the above removal process is finished, it may further initialize and repair the files that may interfere the operation of the machine system. That is, the files are restored to their initial states, thereby ensuring the proper working of the machine system.

6) Loading the cloud behavior linker script library and updating the local behavior linker script library with the former.

The cloud service platform has the following functions.

1) Determining the virus family information corresponding to the virus file behavior scanned at the client. This function may be realized using two below approaches.

In the first approach, the cloud service platform receives a scan log reported by the client, the scan log containing the virus file behavior information scanned by the client, and compares the virus file behavior information with the cloud behavior linker script library to determine the virus family information corresponding to the malicious virus file behavior information. Similarly, the behavior linker script library also contains malicious virus file behavior information of the virus family. The behavior linker script library is obtained by analysis performed on the scan log reported by the clients in each of the machine systems, and may also integrate with manual analysis and provision consideration.

In the second approach, the cloud service platform directly receives the identification result reported by the client, wherein the identification result contains the virus family information determined by the client after matching the scanned virus file behavior information with the local behavior linker script library at the client.

2) Issuing virus removal instructions corresponding to the virus family information to the client based on the correlations between the virus family information and the virus removal instructions. These correlations between the virus family information and the virus removal instructions are maintained in the cloud service platform, and these virus removal instructions are configured to instruct the client to operate and clear behaviors of the corresponding virus families. The correlations may be manually set.

The above-mentioned virus removal instructions include, but not limited to, an instruction for locking a default home page, an instruction for modifying a default browser search page or downloading specified tool software. The above-mentioned specific tool software may be security guard software, system repair mini-tools, removal tools for malicious plug-ins, browser protection tools, etc.

The above-mentioned virus removal instructions corresponding to the virus family information are configurable at the cloud, and based on the behavior analysis on a contemporary virus captured in real time, the corresponding virus removal instructions may be added or adjusted.

In other words, the cloud service platform is capable of providing the client pointedly with a directive instruction to remove a virus genus, thereby avoiding the problem of incomplete removal of virus file caused by simply deleting files at the client.

3) Collectively analyzing the scan log reported by the client of each of the machine systems to obtain an updated virus behavior, and updating the cloud behavior linker script library by using the updated virus behavior.

Figure 2:
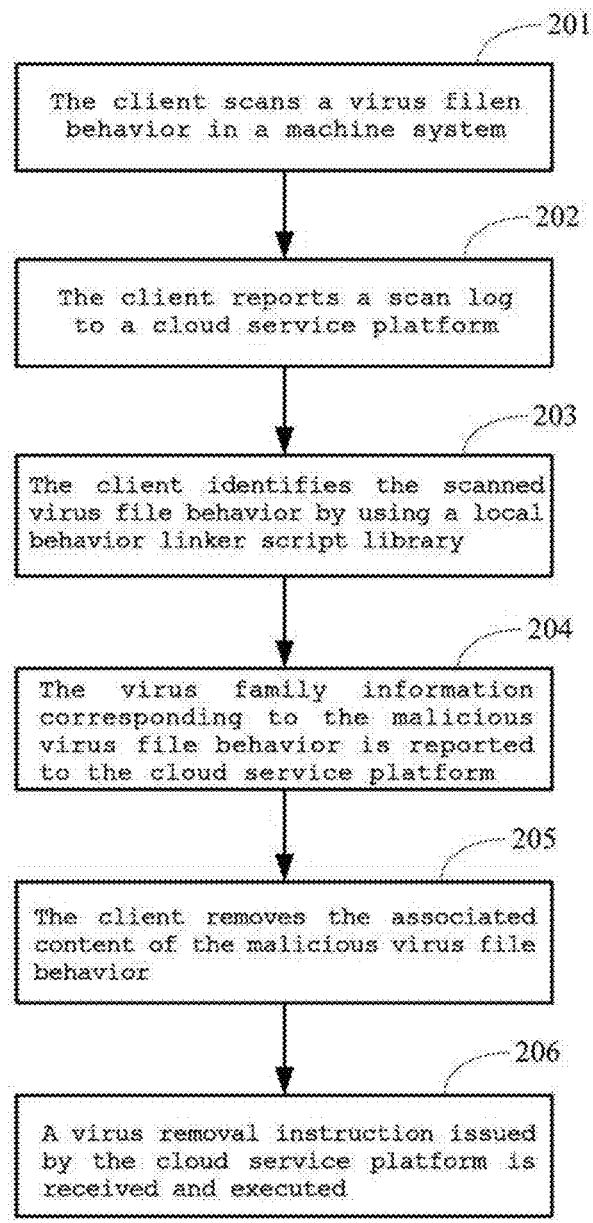
FIG. 2 is a flow chart of a method for treating virus executed by a client provided by an embodiment of the present invention.

Hereinafter, the processes of the method executed at the client and the cloud service platform will be described respectively with reference to the specific embodiments. FIG. 2 is a flow chart of a method for treating virus executed at a client provided by an embodiment of the present invention. As shown in FIG. 2, this process mainly includes the following steps.

In step 201, the client scans a virus file behavior in a machine system. For example, the client scans processes, loading modules, drivers, services, Rootkit, start-up items, IE-related items, boot virus, system directories, desktop directories, start menus, common software, scripts, system components, login sections, and system start-up items.

In step 202, the client reports the scan log to the cloud service platform.

In step 203, the client identifies the scanned virus file behavior by using a local behavior linker script library. If malicious virus file behavior is identified, step 204 is executed, and FIG. 2 only shows this situation. If malicious virus file behavior is not identified, a communication interface between the client and the cloud service platform is monitored. It should be noted that, the monitoring of the communication interface between the client and the cloud service platform does not necessarily commence after malicious virus file behavior is not identified, but may be maintained as continuous monitoring.

It should be noted that steps 202 and 203 may be executed in any sequence or concurrently. FIG. 2 only illustrates one of the execution sequences.

Because the behavior linker script library contains malicious virus file behavior information of virus families, the virus file behavior scanned by the client may be matched with the behavior linker script library using behavior characteristics, linker scripts, etc. If there are consistent behavior characteristics or linker scripts, the malicious virus file behavior is identified and virus family information corresponding to the malicious virus file behavior is determined.

In step 204, the virus family information corresponding to the malicious virus behavior is reported to the cloud service platform. When reporting the virus family information, the client may also report information of the machine system where it is located, such as a GUID (Globally Unique Identifier), simultaneously, so that the cloud service platform may distinguish the machine systems that report the information.

In step 205, because the malicious virus file behavior is identified, the associated content of the malicious virus file behavior will be removed at the client. The above steps 204 and 205 may be performed in any sequence at the same time, and FIG. 2 illustrates one execution sequence only. Following step 204, the client starts monitoring the interface for communication between the client and the cloud service platform. Once a virus removal instruction issued by the cloud service platform is monitored, step 206 is executed, i.e., receiving and executing the virus removal instruction issued by the cloud service platform.

Figure 3:
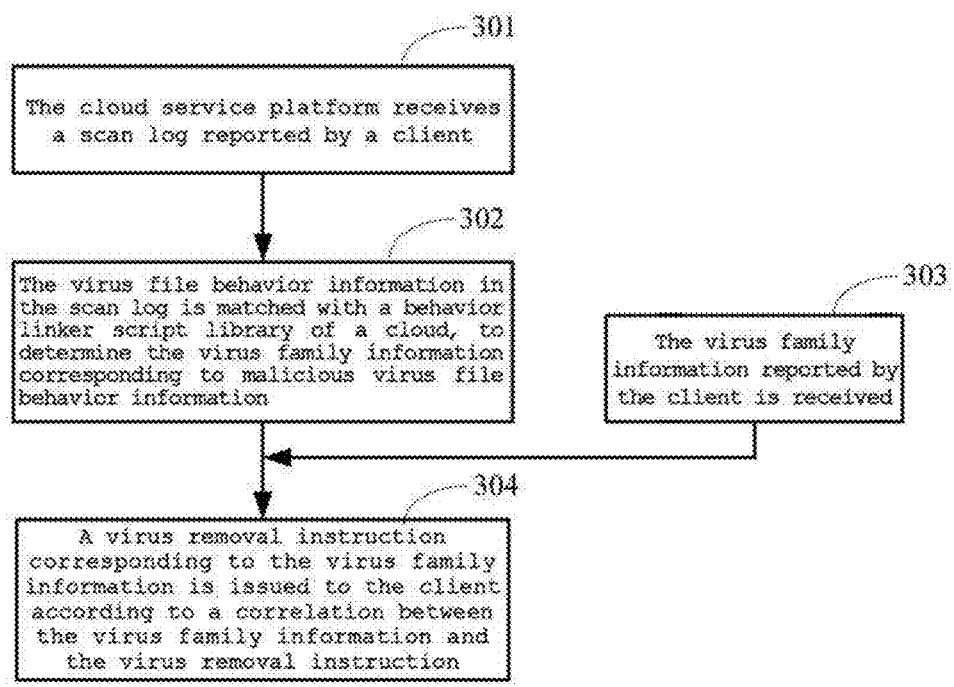
FIG. 3 is a flow chart of a method for treating virus executed by a cloud service platform provided by an embodiment of the present invention.

FIG. 3 is a flow chart of a method for treating virus executed by a cloud service platform provided by an embodiment of the present invention. As shown in FIG. 3, this method includes the following steps.

In step 301, the cloud service platform receives a scan log reported by a client, which contains virus file behavior information scanned by the client.

In step 302, the virus file behavior information in the scan log is matched with a behavior linker script library at a cloud, to determine the virus family information corresponding to the malicious virus file behavior information. Because the behavior linker script library at the cloud is obtained by comprehensively analyzing the scan logs reported by the client of each machine system, the comprehensive analysis actually correlates the scan logs of other machine systems during the identification on the virus file behavior from one client.

The above-mentioned execution of steps 301 and 302 is one executive approach i.e., step 302 is followed by step 304 in the case that the scan log is received. There is the other approach that step 304 is directly executed if the virus family information reported by the client is received in step 303.

In step 304, a virus removal instruction corresponding to the virus family information is issued to the client according to a corresponding relation between the virus family information and the virus removal instruction. The corresponding relation between the virus family information and the virus removal instruction is pre-loaded on the cloud service platform, and corresponding virus removal instructions are respectively set for each virus family to instruct the client to remove the virus file.

In addition, the following circumstance may also exist. For the same client, the virus family information determined by the cloud service platform according to the scan log reported by the client may be inconsistent with the virus family information reported by the client. In other words, when the identification results of the cloud service platform and the identification results of the client are inconsistent, the identification result of the cloud service platform may be used, i.e., the virus removal instruction corresponding to the virus family information determined by the cloud service platform should be issued to the client. Certainly, other measures may also be used. For example, when the identification results of the cloud service platform and of the client are inconsistent, a manual identification may be used, and the virus removal instruction corresponding to the manually identified virus family information is issued to the client.

Figure 4:
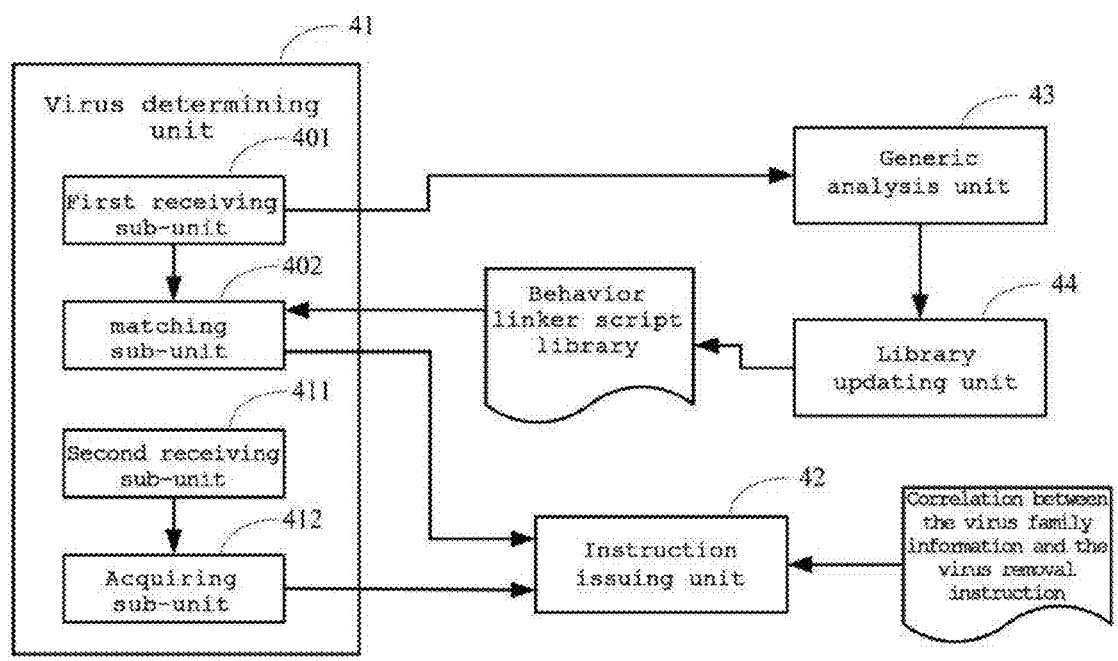
FIG. 4 is a structural view of an apparatus provided by an embodiment of the present invention.

Hereinafter, the apparatus provided by the present invention will be described in detail. FIG. 4 is a structural view of the first apparatus provided by an embodiment of the present invention. The apparatus is provided in a cloud service platform. As shown in FIG. 4, the apparatus includes a virus determining unit 41 and an instruction issuing unit 42, and it may further include a generic analysis unit 43 and a library updating unit 44.

The virus determining unit 41 is used to determine the virus family information corresponding to a virus file behavior scanned by a client. Specifically, the virus determining unit 41 may adopt at least one of the following two approaches to determine the virus family information, and in FIG. 4 it shows a structure of adopting the following two approaches at the same time as an example.

The first approach: the virus determining unit 41 performs virus identification at the cloud service platform based on the scan log reported by the client. In this approach, the virus determining unit 41 may specifically include a first receiving sub-unit 401 and a matching sub-unit 402.

The first receiving sub-unit 401 is used for receiving the scan log reported by the client, wherein the scan log contains virus file behavior information scanned by the client. The matching sub-unit 402 matches the virus file behavior information with a behavior linker script library at a cloud, to determine the virus family information corresponding to malicious virus file behavior information, wherein the behavior linker script library contains the malicious virus file behavior information of the virus family.

The second approach: the virus determining unit 41 directly receives the virus family information reported by the client, i.e., virus identification is performed at the client. In this approach, the virus determining unit 41 specifically includes a second receiving sub-unit 411 and an acquiring sub-unit 412.

The second receiving sub-unit 411 receives the identification result reported by the client. The acquiring sub-unit 412 acquires from the identification result the virus family information, which is determined by the client after matching the scanned virus file behavior with a local behavior linker script library of the client, wherein the behavior linker script library contains the malicious virus file behavior information of the virus family.

The instruction issuing unit 42 is configured to issue virus removal instructions corresponding to the virus family information determined by the virus determining unit 41 to the client based on a correlation between the virus family information and the virus removal instructions, for the client to execute the virus removal instructions to remove the virus file. The correlations between the virus family information and the virus removal instructions are maintained in the cloud service platform, and these virus removal instructions are configured to instruct the client to remove behaviors of the corresponding virus family. Such correlations may also be manually set.

The above virus removal instruction includes, but not limited to, an instruction for locking a default home page, an instruction for modifying a default browser search page or downloading specific tool software, and so on. The specific tool software may be security guard software, system fixing mini-tools, tools for removing malicious plug-ins, browser protection tools, and so on.

The above virus removal instruction corresponding to the virus family information is configurable at the cloud, and based on the behavior analysis on a contemporary virus captured in real time, the corresponding virus removal instruction may be added or adjusted.

In addition, the following circumstance may exist. Given that the virus family information determined by the above two approaches for determining the virus family information is different from each other, it is possible to issue the virus removal instruction corresponding to the virus family information determined by the cloud service platform to the client. Naturally, other measures may also be used. For example, when the identification results of the cloud service platform and the client are inconsistent with each other, a manual operation may be used for the identification, and the virus removal instruction corresponding to the manually identified virus family information is issued to the client.

The above behavior linker script library is obtained by analyzing the scan logs respectively reported by the client in each machine system, and it may also be integrated with factors of manual analysis and setting. As the virus continues to evolve, new virus file behaviors will continually appear. Therefore, the cloud service platform needs to update the behavior linker script library in time. In view of this, the generic analysis unit 43 analyzes the scan logs reported by the clients to obtain updated virus file behaviors, and the library updating unit 44 updates the behavior linker script library of the cloud with the updated virus file behaviors.

Figure 5:
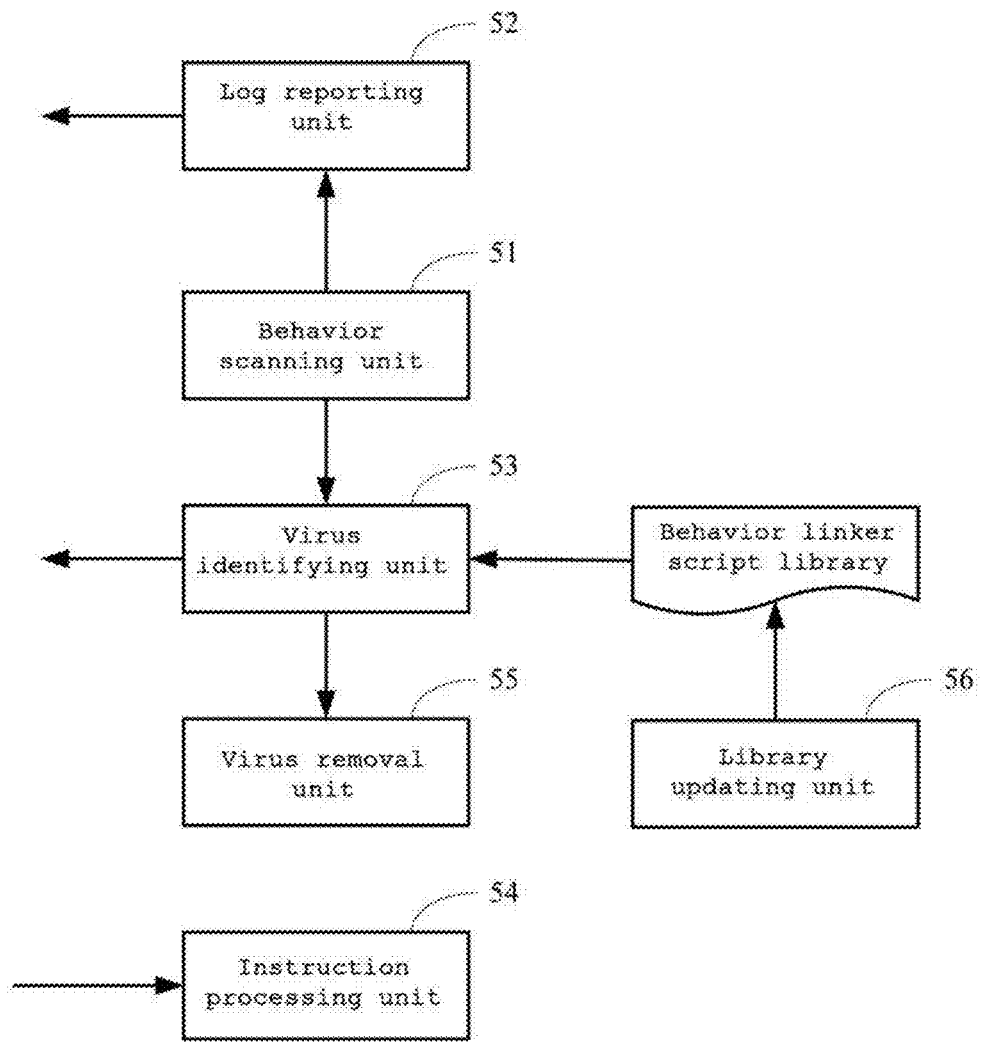
FIG. 5 is a structural view of another apparatus provided by an embodiment of the present invention.

FIG. 5 is a structural view of another apparatus for treating virus provided by an embodiment of the present invention. The apparatus is set at the client in a machine system. As shown in FIG. 5, the apparatus specifically includes at least one of a log reporting unit 52 and a virus identifying unit 53 (FIG. 5 shows both of the two units as an example), a behavior scanning unit 51, and an instruction processing unit 54, and it may further include a virus removal unit 55 and a library updating unit 56.

The behavior scanning unit 51 is used for scanning virus file behavior information, i.e., scanning the content of all the possible behaviors of a malicious virus file in the machine system, and the virus file behavior information may be the behavior information obtained by scanning at least one of the following items: network repair, processes, loading modules, drivers, services, Rootkit, start-up items, IE-related items, boot virus, system directories, desktop directories, start menus, common software, scripts, system components, login sections, system start-up items, and so on.

The log reporting unit 52 is used for reporting a scan log to a cloud service platform, the scan log containing virus file behavior information scanned by the behavior scanning unit 51, and being reported to the cloud service platform for analysis and identification.

The virus identifying unit 53 identifies the virus file behavior by using a local behavior linker script library. If a malicious virus file behavior is identified, the unit 53 reports the virus family information corresponding to the malicious virus file behavior to the cloud service platform, wherein the behavior linker script library contains malicious virus file behavior information of a virus family.

The instruction processing unit 54 receives and executes a virus removal instruction issued by the cloud service platform.

Specifically, the virus removal instruction includes, but not limited to, following instructions: locking a default home page, modifying a default browser search page, downloading specific tool software, or removing associated content of a malicious virus behavior.

Further, if the virus identifying unit 53 identifies the malicious virus file behavior, the virus removal unit 55 removes the associated content of the malicious virus behavior. The removing the associated content of the malicious virus behavior includes, but not limited to, stopping services of the malicious virus file, deleting files, registry items and related activity items of the malicious virus file, and fixing the browser default home page.

The local behavior linker script library at the client is obtained by loading the behavior linker script library of the cloud service platform and storing the same locally. The client may periodically load the behavior linker script library from the cloud service platform and update the local behavior linker script library. The library updating unit 56 loads the behavior linker script library at the cloud, and updates the local behavior linker script library with the behavior linker script library of the cloud.

It can be understood from the above description that the method, apparatus, and system provided by the present invention have the following advantages.

1) Compared with simply analyzing virus behavior and deleting files by the client, issuing the virus removal instruction regarding the virus family information from the cloud in the present invention is more individualized and precise on treating virus, and the security of the machine system is improved.

2) In the present invention, the virus removal instruction issued for the virus family information by the cloud service platform is not limited to removing the associated content of the malicious virus file behavior, and may also lock a default home page, modify a default browser search page, download specified tool software, and so on. Thus the present invention has more diverse approaches to treat virus, facilitates to completely remove the virus file, and improves the security of the machine system.

3) The cloud service platform is capable of updating the behavior linker script library by integrating the scan logs reported by the clients of different machine systems, thereby timely meeting the fast updating feature of the Internet virus.

4) The virus removal instruction for the virus family information in the cloud service platform can be flexibly configured and timely added or adjusted, so as to meet the requirement of rapid response in the age of Internet.

According to the several embodiments provided in the present invention, it should be understood that the disclosed system, apparatus, and method may be implemented using other approaches. For example, the described apparatus embodiment is merely exemplary. For example, the division of different units is merely a logical functional division and may be changed according to practical applications.

The units are described as separate components but they may or may not be physically separated. The components displayed as units may or may not be physical units, namely located in a physical location, or distributed over a plurality of network units. Some or all of the units may be selected based on actual needs to achieve the objectives of the embodiments.

In addition, the functional units in the embodiments of the present invention may be integrated into one processing unit, or exist physically as individual units, or two or more of the units may be integrated into one unit. The integrated unit may be implemented in a form of hardware, or in a form of a functional unit of hardware and software.

The integrated unit that is implemented in the form of a software functional unit may be stored in a computer-readable storage medium. The software functional unit is stored in a storage medium, and includes several instructions for instructing a computer device (which may be a personal computer, a server, or a network device) or a processor to perform partial steps of the methods described in the embodiments of the present invention. The aforementioned storage medium includes any medium that may store program codes, such as a USB flash drive, a removable hard disk, a Read-Only Memory (ROM), a Random Access Memory (RAM), a magnetic disk, or an optical disc.

The above description merely provides preferred embodiments of the present invention, and is not intended to limit the present invention. Any modification, equivalent replacement, improvement and the like made under the spirit and principle of the present invention shall fall in the protection scope of the present invention.

The disclosure also provides the following technical solutions.

Solution 1. A method for treating virus, comprising:
  determining virus family information corresponding to virus file behavior scanned by a client and
  issuing a virus removal instruction corresponding to the determined virus family information to the client based on a correlation between the virus family information and the virus removal instruction, for the client to execute the virus removal instruction to remove a virus file.

Solution 2. The method according to solution 1, wherein the determining virus family information corresponding to a virus file behavior scanned by a client comprises:
  receiving a scan log reported by the client, the scan log containing virus file behavior information scanned by the client and
  matching the virus file behavior information with a cloud behavior linker script library to determine virus family information corresponding to malicious virus file behavior, wherein the behavior linker script library contains malicious virus file behavior information of a virus family.

Solution 3. The method according to solution 1, wherein the determining virus family information corresponding to a virus file behavior scanned by a client comprises:
  receiving an identification result reported by the client and
  acquiring the virus family information determined by the client by matching the scanned virus file behavior information with a local behavior linker script library at the client, from the identification result, wherein the behavior linker script library contains malicious virus file behavior information of the virus family.

Solution 4. The method according to solution 2, further comprising:
  analyzing the scan log reported by the client to obtain updated virus file behavior information; and
  updating the cloud behavior linker script library with the updated virus file behavior information.

Solution 5. The method according to solution 2, wherein the determining virus family information corresponding to a virus file behavior scanned by a client further comprises:
  receiving an identification result reported by the client and
  acquiring virus family information determined by the client by matching the scanned virus file behavior information with a local behavior linker script library at the client, from the identification result, wherein the behavior linker script library contains malicious virus file behavior information of the virus family.

Solution 6. The method according to solution 5, further comprising:
  determining the issued virus removal instruction by using the virus family information determined by matching the virus file behavior information contained in the scan log with the cloud behavior linker script library, or determining the issued virus removal instruction by using manually identified virus family information, if the virus family information determined by matching the virus file behavior information contained in the scan log with the cloud behavior linker script library is inconsistent with the virus family information acquired from the identification result.

Solution 7. The method according to any one of solutions 1-6, wherein the virus file behavior information is the behavior information obtained by scanning at least one of the following items:

processes, loading modules, drivers, services, Rootkit, start-up items, IE-related items, boot virus, system directories, desktop directories, start menus, common software, scripts, system components, login sections, and system start-up items.

Solution 8. The method according to any one of solutions 1-6, wherein the virus removal instruction includes following instructions:

locking a default home page, modifying a default browser search home page, downloading a specified tool software, or removing associated content of the malicious virus file behavior.

Solution 9. A method for treating virus, comprising:
scanning a virus file behavior;
reporting a scan log to a cloud service platform; and/or, identifying the virus file behavior by using a local behavior linker script library, and reporting virus family information corresponding to the malicious virus file behavior to the cloud service platform if a malicious virus file behavior is identified, wherein the behavior linker script library contains malicious virus file behavior information of a virus family; and
receiving and executing a virus removal instruction issued by the cloud service platform.

Solution 10. The method according to solution 9, further comprising removing the associated content of the malicious virus file behavior, if the malicious virus file behavior is identified.

Solution 11. The method according to solution 9, further comprising:

loading a cloud behavior linker script library, and updating the local behavior linker script library with the cloud behavior linker script library.

Solution 12. The method according to any one of solutions 9-11, wherein the virus removal instruction includes following instructions:

locking a default home page, modifying a default browser search home page, downloading specified tool software, or removing associated content of the malicious virus file behavior.

Solution 13. An apparatus for treating virus, comprising:
a virus determining unit, configured to determine virus family information corresponding to a virus file behavior scanned by a client and
an instruction issuing unit, configured to issue a virus removal instruction corresponding to the virus family information determined by the virus determining unit to the client based on a correlation between the virus family information and the virus removal instruction, for the client to execute the virus removal instruction to remove the virus file.

Solution 14. The apparatus according to solution 13, wherein the virus determining unit comprises:

a first receiving sub-unit, configured to receive a scan log reported by the client, the scan log containing virus file behavior information scanned by the client and a matching sub-unit, configured to match the virus file behavior information with a cloud behavior linker script library, and to determine virus family information corresponding to a malicious virus file behavior, wherein the behavior linker script library contains malicious virus file behavior information of a virus family.

Solution 15. The apparatus according to solution 13, wherein the virus determining unit comprises:

a second receiving sub-unit, configured to receive an identification result reported by the client;
an acquiring sub-unit, configured to acquire virus family information from the identification result, the virus family information being determined by the client by matching the scanned virus file behavior information with a local behavior linker script library of the client, wherein the behavior linker script library contains malicious virus file behavior information of the virus family.

Solution 16. The apparatus according to solution 14, further comprising:

a generic analysis unit, configured to analyze the scan log reported by the client to obtain updated virus file behavior information; and
a library updating unit, configured to update the cloud behavior linker script library with the updated virus file behavior information.

Solution 17. The apparatus according to solution 14, wherein the virus determining unit further comprises:

a second receiving sub-unit, configured to receive an identification result reported by the client;
an acquiring sub-unit, configured to acquire virus family information from the identification result, the virus family information being determined by the client by matching the scanned virus file behavior information with a local behavior linker script library of the client, wherein the behavior linker script library contains malicious virus file behavior information of the virus family.

Solution 18. The apparatus according to solution 17, wherein if the virus family information determined by the matching sub-unit is inconsistent with the virus family information acquired by the acquiring sub-unit, the instruction issuing unit determines the issued virus removal instruction by using the virus family information determined by the matching sub-unit, or determines the issued virus removal instruction by using manually identified virus family information.

Solution 19. The apparatus according to any one of solutions 13-18, wherein the virus file behavior information is behavior information obtained by scanning at least one of the following items:

processes, loading modules, drivers, services, Rootkit, start-up items, IE-related items, boot virus, system directories, desktop directories, start menus, common software, scripts, system components, login sections, and system start-up items.

Solution 20. The apparatus according to any one of solutions 13-18, wherein the virus removal instruction comprises following instructions:

locking a default home page, modifying a default browser search home page, downloading specified tool software, or removing associated content of the malicious virus file behavior.

Solution 21. An apparatus for treating virus, wherein it comprises at least one of a log reporting unit and a virus identifying unit, a behavior scanning unit, and an instruction processing unit, wherein the behavior scanning unit is configured to scan a virus file behavior;

the log reporting unit is configured to report a scan log to a cloud service platform;

the virus identifying unit is configured to identify the virus file behavior by using a local behavior linker script library, and report virus family information corresponding to the malicious virus file behavior to the cloud service platform if a malicious virus file behavior is identified, wherein the behavior linker script library contains malicious virus file behavior information of a virus family; and the instruction processing unit is configured to receive and execute a virus removal instruction issued by the cloud service platform.

Solution 22. The apparatus according to solution 21, further comprising:

a virus removal unit, configured to remove the associated content of the malicious virus file behavior if the virus identifying unit identifies the malicious virus file behavior.

Solution 23. The apparatus according to solution 21, further comprising:

a library updating unit, configured to load the cloud behavior linker script library, and update the local behavior linker script library with the cloud behavior linker script library.

Solution 24. The apparatus according to any one of solutions 21-23, wherein the virus removal instruction comprises following instructions:

locking a default home page, modifying a default browser search home page, downloading specified tool software, or removing the associated content of the malicious virus file behavior.

Solution 25. A system for treating virus, comprising a client and a cloud processing platforms, wherein the cloud processing platform comprises the apparatus according to any one of solutions 13-18; and the client comprises the apparatus according to any one of solutions 21-23.

Solution 26. A device, comprising:

one or more processors;

a memory;

one or more programs, the one or more programs being stored in the memory, wherein when the one or more programs are executed by the one or more processors, the device determines virus family information corresponding to a virus file behavior scanned by a client; and issues a virus removal instruction corresponding to the determined virus family information to the client according to a correlation between the virus family information and the virus removal instruction, for the client to execute the virus removal instruction to remove virus.

Solution 27. A device, comprising:

one or more processors;

a memory;

one or more programs, the one or more programs being stored in the memory, wherein when the one or more programs are executed by the one or more processors, the device scans a virus file behavior;

reports a scan log to a cloud service platform; and/or identifies the virus file behavior by using a local behavior linker script library, and reports virus family information corresponding to the malicious virus file behavior to the cloud service platform if a malicious virus file behavior is identified, wherein the behavior linker script library contains malicious virus file behavior information of a virus family; and receives and executes a virus removal instruction issued by the cloud service platform.

Solution 28. A non-volatile computer storage medium, the computer storage medium storing one or more programs, wherein when the one or more programs are executed by a device, enables the device is enabled to determine virus family information corresponding to a virus file behavior scanned by a client; and issue a virus removal instruction corresponding to the determined virus family information to the client based on a correlation between the virus family information and the virus removal instruction, for the client to execute the virus removal instruction to remove virus.

Solution 29. A non-volatile computer storage medium, the computer storage medium storing one or more programs, wherein when the one or more programs are executed by a device, the device is enabled to scan a virus behavior;

report a scan log to a cloud service platform; and/or, identify the virus behavior by using a local behavior linker script library, and report virus family information corresponding to the malicious virus file behavior to the cloud service platform if a malicious virus file behavior is identified, wherein the behavior linker script library contains malicious virus file behavior information of a virus family; and receive and execute a virus removal instruction issued by the cloud service platform.

What is claimed is:

1. A method for treating a virus, comprising: determining virus family information corresponding to virus file behavior identified by a client; and issuing a virus removal instruction corresponding to the determined virus family information to the client based on a correlation between the virus family information and the virus removal instruction, the client executing the virus removal instruction to remove a virus file, wherein determining virus family information corresponding to the virus file behavior identified by the behavior information identified by the client; and matching the virus file behavior information with a cloud behavior linker script library to determine virus family information corresponding to malicious virus file behavior, wherein the cloud behavior linker script library includes malicious virus file behavior information of a virus family.

2. The method according to claim 1, further comprising: analyzing the scan log reported by the client to obtain updated virus file behavior information; and updating the cloud behavior linker script library with the updated virus file behavior information.

3. The method according to claim 1, wherein determining virus family information corresponding to the virus file behavior identified by the client further comprises: receiving an identification reported by the client; and acquiring virus family information determined by the client by matching the identified virus file behavior information with a local behavior linker script library at the client, from the identification, wherein the local behavior linker script library-includes malicious virus file behavior information of the virus family.

4. An apparatus for treating a virus, comprising:
a processor and memory, wherein the memory stores:
a virus determining unit configured to determine virus family information corresponding to a virus file behavior identified by a client; and an instruction issuing unit configured to issue a virus removal instruction corresponding to the virus family information determined by the virus determining unit to the client based on a correlation between the virus family information and the virus removal instruction, wherein the client is configured to execute the virus removal instruction to remove a virus file, wherein the virus determining unit comprises: a first receiving sub-unit configured to receive a scan log reported by the client, the scan log including virus file behavior information identified by the client; and a matching sub-unit configured to match the virus file behavior information with a cloud behavior linker script library, and to determine virus family information corresponding to a malicious virus file behavior wherein the cloud behavior linker script library includes malicious virus file behavior information of a virus family.

5. The apparatus according to claim 4 further comprising: a generic analysis unit; configured to analyze the scan log reported by the client to obtain updated virus file behavior information; and a library updating unit; configured to update the cloud behavior linker script library with the updated virus file behavior information.

6. The apparatus according to claim 4, wherein the virus determining unit further comprises: a second receiving sub-unit; configured to receive an identification reported by the client; and an acquiring sub-unit; configured to acquire virus family information from the identification, the virus family information determined by the client by matching the identified virus file behavior information with a local behavior linker script library of the client, wherein the local behavior linker script library includes malicious virus file behavior information of the virus family.

7. A non-transitory computer storage medium storing a plurality of instructions that, when executed by an apparatus, cause the apparatus to perform the method of: determining virus family information corresponding to a virus file behavior identified by a client; and issuing a virus removal instruction corresponding to the determined virus family information to the client based on a correlation between the virus family information and the virus removal instruction, the client to executing the virus removal instruction to remove virus, wherein determining virus family information client; and matching the virus file behavior information with a cloud behavior linker script library to determine virus family information corresponding to malicious virus file behavior wherein the cloud behavior linker script library includes malicious virus file behavior information of a virus family.

* * * * *